United States Patent Office 3,584,066
Patented June 8, 1971

3,584,066
METHOD OF CHLORINATING PARAFFINS
Cesare Reni and Luigi Lugo, Milan, Italy, assignors to Societa Italiana Resine S.p.A., via Grazioli, Milan, Italy
No Drawing. Filed Jan. 5, 1967, Ser. No. 607,376
Claims priority, application Italy, Jan. 11, 1966, 523/66
Int. Cl. C07c *17/10*
U.S. Cl. 260—660      4 Claims

ABSTRACT OF THE DISCLOSURE

A liquid phase, non catalytic continuous method of chlorinating paraffins, comprising introducing liquid paraffin alone or mixed with inert gas at one end of a tubular reactor, maintaining the paraffin in liquid condition under the influence of temperature and pressure, withdrawing reaction gases at the other end of the reactor and scrubbing said reaction gases with a fresh paraffin charge.

---

This invention relates to a liquid phase continuous cycle non-catalystic method of chlorinating paraffins by means of gaseous chlorine. More particularly, a method is described which can be employed for preparing monochloro derivatives of linear chain paraffins having a carbon atom number in the molecule of from 10 to 14. These products have of late become of great importance for the synthesis of biologically degradable synthetic detergents.

A number of substitutive chlorination methods are known in the art for organic compounds employing gaseous chlorine, wherein the thermal or catalytic reaction is carried out in a liquid or gaseous phase.

In the case of paraffin mixture within the above mentioned range when thermally chlorinating in the vapor phase the preferred operational temperatures range between 240° and 260° C., though this range may be expanded to 230° to 350° C. approximately. Due to these high temperatures, the process suffers from a number of drawbacks chiefly due to cracking and dehydrochlorination. There is therefore a low yield and hence the process has not been used in industry.

When chlorinating in a liquid phase operation is carried out at a temperature from room temperature up to about 200° C., the preferred temperatures ranging between 100° and 150° C.

In the process of UV radiations the reaction can be carried out at lower temperatures; however, the process is not economical due to the high quantity of power required for generating the radiations, the excessive paraffin/chlorine ratios in the feed which make necessary repeated treatments of the partly chlorinated liquid mixture with ensuing possibility of formation of more highly chlorinated products.

Moreover, considerable technological difficulties are encountered in the construction of reactors such as to afford a normally uniform yield on flow of the liquid. Finally, the brittleness of the quartz lamps and the necessity for periodical maintenance in order to eliminate carbonaceous deposits on the wall will prejudice the progress of the reaction owing to decreased yield over a period, cause further difficulties.

Liquid phase non-catalytic chlorination methods have disadvantages in distributing the liquid and gaseous reagents. A non-uniform distribution results in the formation of more highly chlorinated products and thus causing lower monochloroparaffin yield. A further consequence is the difficulty of removing unaltered chlorine in the reaction products as even by employing relatively long contact periods no satisfactory chlorine conversions are obtained. This is particularly objectionable owing to the partial loss of an expensive reagent and additionally because the hydrogen chloride obtained is contaminated by chlorine and therefore requires a preliminary purification for successive use.

Finally, due to the highly exothermic reaction, products of a pitchy and carbonaceous nature are formed in considerable quantity owing to uncontrolled paraffin-chlorine reactions at preferential attack regions at which the temperature reaches high values which lead to a further decreased yield. These undesirable products are deposited on the reactor walls and adversely affect the heat exchange as reaction progresses in time, thereby prejudicing the reaction itself.

According to the present invention we provide a liquid-phase, non-catalytic, continuous method of chlorinating paraffins, comprising introducing liquid paraffin and gaseous chlorine alone or mixed with inert gas at one end of a tubular reactor, maintaining the temperature and pressure in the reactor at a value such as to avoid boiling of paraffin, obtaining reaction gases at the other end of the reactor and scrubbing the reaction gases with a fresh paraffin charge.

Preferably linear paraffins with a carbon atom number in the molecule ranging between 10 and 14 are used.

By the use of this method it is possible to obtain high monochloroparaffin yields and to practically exhaust the chlorine used in the reaction, thereby avoiding the formation of carbonaceous and pitchy products. The reagents may be thoroughly distributed in the chlorination reaction which is easily controllable, by supplying to the foot of a tubular reactor paraffin and gaseous chlorine diluted with an inert gas, recycling to the reactor foot a certain quantity of liquid reaction products and scrubbing the gaseous chlorination products with the freshly charged paraffins before feeding them to the reactor foot.

Supplying gaseous chlorine diluted by means of an inert gas in a liquid reaction medium affords an improved control of chlorination, as preferential chlorine attack points on the paraffin are avoided and the reaction is further prevented from occurring at restricted regions in the reactor at which high percentages of the supplied chlorine are exhausted.

Since the reaction is uniformly distributed throughout the reactor temperature peaks are avoided and dehydrochlorination processes as well as the formation of pitch and carbonaceous products are avoided. Due to the improved distribution of the reagents and smaller chlorine quantity dissolved in the reaction products owing to the decreased vapor pressure of the chlorine through the presence of inert gas, the quantity of polychlorinated side products is reduced.

Recycling a fraction of the liquid reaction product to the reactor foot permits carrying out chlorination within lower temperature ranges thereby avoiding any reaction extinguishing process. Such reaction may also be due to the presence in the recycled paraffins, which should be subjected to alkylation and fractionation before recycling, of benzol traces which act as inhibitor of the paraffin-chlorine reaction. Finally, by scrubbing the reaction gases with fresh paraffin the unaltered chlorine in the gaseous reaction products is recovered, considerably pure hydrogen chloride is obtained and the feed chlorine is practically fully converted. Chlorine may be diluted by means of inert gases such as nitrogen, however, it has been found that hydrogen chloride can be used, which behaves as an inert gas though it is a reaction product. By employing hydrogen chloride as inert gas the further advantage results of avoiding separation of the inert gas from the other gaseous reaction products.

The chlorination reaction may be carried out at from atmospheric pressure to about 3 atmospheres over-pressure. However, ambient pressure or only slightly raised pressure is preferred.

The process is usefully employed for the synthesis of monochloro derivatives of paraffin with a carbon atom number in the molecule ranging between 10 and 14. The molar ratio of paraffin/chlorine may range within wide limits, generally 10:1 to 2:1; however, the preferred embodiments of the method employs ratios ranging between 5:1 and 3:1.

The reaction temperatures range between 80 and 150° C., preferably 90° and 130° C. The quantity of liquid reaction product recycled to the reactor foot is such that the feed is of a chloroparaffin-paraffin molar ratio ranging between 0.5:100 and 8:100, preferably 1:100 and 3:100.

The quantity of inert gas supplied together with chlorine to the chlorination reactor foot is such that the inert gas/chlorine volume ratio ranges between 0.5:1 and 10:1, preferably 1:1 and 3:1.

The reaction gases are scrubbed in columns with a filler, the gas being supplied to the bottom and fresh paraffin to the top of the column.

The reactors which may be used may be of glass, lead or carbon steel, are of cylindrical shape, and may be equipped with an external jacket for circulation of a coolant, pre-heater for the foot liquid feed, over head gas-liquid separating arrangement and gas distribution arrangement.

Owing to the necessity of removing the reaction heat, the length to diameter ratio of the chlorination reactor preferably ranges between 150 and 30 approximately when jacketed tubes are employed. This ratio can be smaller than 30 when a coil system is employed within the reactor for removing the reaction heat.

Spatial velocities taken as volume of paraffins supplied to a given reactor volume per hour preferably range between 0.4 and 0.7.

The following example further illustrates the invention.

EXAMPLE

A laboratory apparatus of glass, of cylindrical shape, 300 cm. in length and 2.6 cm. in diameter is supplied with 795 cu. cm./hour measured at room temperature of an n-paraffin mixture of the following composition by weight determined by chromatographic gas analysis:

|  | Percent |
|---|---|
| $C_{10}$ | 4.1 |
| $C_{11}$ | 38.6 |
| $C_{12}$ | 35.8 |
| $C_{13}$ | 17.9 |
| $C_{14}$ | 3.6 |

The average molecular weight of the paraffin mixture is 167.3, the carbon atom number in the molecule equalling about 11.8.

This paraffin mixture had been fed before preheating to 95–100° C. and admission to the reactor foot to the top of a glass column 100 cm. high and 2.6 cm. in diameter filled with glass rings of about 0.5 cm. in contracurrent with the reaction gas which was fed at a rate of about Nl./h. to the foot of the column.

The paraffinic reagent is therefore saturated with hydrochloric acid, contains about 2.5 g./l. chlorine and is supplied to the pre-heater and to the foot of the chlorinator together with about 60 cu. cm./h. of the liquid reaction product recycled from the reactor top.

The hourly feed to the chlorination reactor foot is therefore about 3.73 moles/hour paraffin, the chloroparaffin-paraffin feed ratio amounting to about 2:100 in moles.

25 Nl./h. chlorine equalling 79.5 g./h. approximately are fed through a porous diaphragm to the foot of the chlorination reactor together with 30 Nl./h. approximately of hydrochloric acid recycled from the overhead gaseous products of the reactor, containing traces of unreacted chlorine.

By circulating liquid in the outer reactor jacket, the temperature within the reactor is prevented from exceeding 130° C. Gaseous products are separated from liquid products at the top of the reactor.

The gaseous products separating at a rate of about 55 Nl./h. are recycled in part to the reactor foot (about 30 Nl./h.), the residue (about 25 Nl./h.) being conveyed to the foot of the scrubbing column.

The output with respect to the chlorine feed exceeds 99.5%, the obtained hydrochloric acid containing but slightest chlorine traces.

The liquid reaction products obtained at a rate of about 860 cu.cm./h. measured at room temperature are recycled in part to the reactor foot together with the paraffin charge.

On analysing the reaction product after removal of the dissolved gases, the chlorine weight was 6.3–6.4%, the average molecular weight being about 178–179, so that, independently of distribution, about 32 chlorine atoms to 100 paraffin molecules have been bound.

The reactor operated at atmospheric pressure, the feed pressure being such as to overcome the pressure losses in the system.

A study of the chlorine distribution was effected by alkylation with aluminum chloride in the presence of excess benzol of the paraffin-chloroparaffin mixture.

By means of repeated alkylations (carried out under strictly standardized conditions) and gas-chromatographic and infra-red analysis of all reaction products and side products, it could be determined that the conditions in the paraffin-chloroparaffin mixture were such that about 90% of the chlorine atoms had become bound to form monochloroparaffin, the remaining atoms having given more highly chlorinated products.

What we claim is:

1. A process for continuously preparing monochloro derivatives of linear chain paraffins having from 10 to 14 carbon atoms in the molecule, by non-catalytic liquid-phase chlorination by means of gaseous chlorine which comprises:
   (a) introducing to the foot of a tubular reactor having a maximum height:diameter ratio of 150 linear paraffins having from 10 to 14 carbon atoms in the molecule, chloroparaffin and gaseous chlorine, the molar ratio of paraffins to the chlorine in the feed being from 2:1 to 10:1,
   (b) introducing to the foot of said reactor an inert gas wherein the inert gas:chlorine volume ratio in the feed is from 0.5:1 to 10:1,
   (c) introducing to the foot of said reactor sufficient liquid reaction products so that the chloroparaffin: paraffin molar ratio in the feed is from 0.5:100 to 8:100,
   (d) operating at a spatial velocity of paraffins of from 0.4 to 0.7 volumes per volume of reactor per hour, thereby producing liquid reaction products,
   (e) performing said chlorination at a temperature of from 90 to 150° C. and at a pressure of from about 1 to 3 atmospheres, and
   (f) recovering reaction products at the top of said reactor.

2. A process as in claim 1, wherein said inert gas is hydrogen chloride which has been recycled from the chlorination reaction products.

3. A process for continuously preparing monochloro derivatives of linear chain paraffins having from 10 to 14 carbon atoms in the molecule by the non-catalytic liquid-phase chlorination by means of gaseous chlorine which comprises:
   (a) introducing to the foot of a tubular reactor having a height:diameter ratio of from 30 to 150 linear paraffins having from 10 to 14 carbon atoms in the molecule, chloroparaffin and gaseous chlorine, the molar ratio of paraffins to chlorine in the feed being between 5:1 and 3:1, (b) introducing to the foot of said reactor gaseous hydrochloric acid, the hydrochloric acid:chlorine volume ratio in the feed being from 1:1 to 3:1, (c) introducing to the foot of said reactor sufficient liquid reaction products so that the chloroparaffin:paraffin molar ratio in the feed is from 1:100 to 3:100, (d) operating at a spatial velocity of paraffins of from 0.4 to 0.7 volumes per volume of reactor per hour, thereby producing liquid reaction products, (e) performing said chlorination at a temperature of from 90 to 130° C. and at ambient pressure, and (f) recovering reaction products at the top of said reactor.

4. A process as in claim 3, wherein said hydrochloric acid introduced to the foot of said reactor is recycled from the chlorination reaction products.

References Cited

UNITED STATES PATENTS

| | | | |
|---|---|---|---|
| 2,374,933 | 5/1945 | Harding | 260—660X |
| 2,385,200 | 9/1945 | Friedel | 260—660 |
| 3,259,664 | 7/1966 | Ray et al. | 260—660X |
| 3,445,533 | 5/1969 | Mottern | 260—660 |

FOREIGN PATENTS

| | | | |
|---|---|---|---|
| 649,130 | 9/1962 | Canada | 260—660 |
| 699,242 | 12/1964 | Canada | 260—660 |

BERNARD HELFIN, Primary Examiner

J. A. BOSKA, Assistant Examiner